Patented Jan. 10, 1950

2,494,125

UNITED STATES PATENT OFFICE 2,494,125

5-ACYLAMINO URACILS AND PROCESS OF MAKING THE SAME

George H. Hitchings, Tuckahoe, N. Y., and Randall L. Thompson, Richmond, Va., assignors to Burroughs Wellcome & Co. (U. S. A.) Inc., New York, N. Y., a corporation of New York No Drawing. Application August 28, 1946, Serial No. 693,574

4 Claims. (Cl. 260—260)

The present invention relates to new chemical compounds which have been found to be active as virus growth inhibitors and to the process of making these compounds. It has been found that certain acyl derivatives of 5-aminouracil are capable of inhibiting the growth and multiplication of certain bacteria such as Lactobacillus casei, and of certain viruses such as vaccinia virus, derived from the causative agent of smallpox.

The compounds that have been found to be most efficient as virus growth inhibitors can be defined by the following general formula

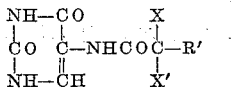

where X is a halogen selected from the group consisting of fluorine, chlorine and bromine, X' is selected from the group consisting of X and hydrogen and R' is a radical selected from the group consisting of hydrogen and the alkyl radicals containing from 1 to 4 carbon atoms.

It is believed, although the invention should be in no way limited by this theoretical explanation, that these substances act as antimetabolites for the pyrimidine thymine (5-methyluracil). The latter substance is one of the essential constituents of thymonucleic acid, which is believed to be essential to the reproduction of most cellular organisms and viruses. The new compounds seem to be sufficiently similar to thymine to take the place of the latter in one or more structures essential to the growth and reproduction of the virus or cell, but they are unable to perform the functions of thymine and, thus, they prevent the normal development of the structures into which they have entered. It has been found that substituted aminouracils having substituent acyl groups which may be expected to enhance the ionization of the remaining hydrogen atom of the amino group are particularly active as virus growth inhibitors. In general, it appears that the more active compounds are those derived from acids with dissociation constants greater than $10^{-5}$. However, it is not intended to imply that the strongest acids will give the most active compounds nor is it intended to limit the invention in any way by this explanation except as expressed in the appended claims.

The inhibitory effect of these compounds on the bacteria and viruses may be shown in vitro by the addition of the compound to be tested to the medium in which the bacterium or virus is growing. For example, vaccinia virus may be grown in a medium containing inorganic salts and nutrients with small amounts of serum and chick embryo tissue. Under these conditions the vaccinia virus ordinarily multiples itself about 100-fold within a few days. The ability of a chemical to affect this growth or multiplication of the virus can be tested by the addition of the compound to such a medium. Many compounds, if added in high concentration, can interfere with the growth of the virus. However, the group of compounds described herein are exceptionally active in that they inhibit the growth of the virus at very low concentrations. Thus 5-(chloroacetamino)-uracil when added at a dilution of 1:100,000 not only prevented the multiplication of the virus but resulted in the destruction of most of the virus which was added to inoculate the medium, whereas the closely related compound uracil-5-acetic acid amide, at the higher concentration represented by a dilution of 1:10,000 not only did not prevent the growth of the virus but seemed to stimulate it somewhat.

The effect of these compounds in the inhibition of the multiplication of the virus could also be shown in animal experiments, in which young mice were inoculated with vaccinia virus intracerebrally. Under these circumstances it could be shown, for example, that when 2 mgm. of 5-(chloroacetamino)-uracil was administered by introperitoneal injection three times per day, more than twice the usual dose of virus was required to produce the death of one-half of the mice tested. In other words, the average mouse was able to withstand twice as much virus, when treated as it could when untreated. These experiments illustrate the protective action against viruses of the compounds described herein.

EXAMPLE 1

5-(chloroacetamino)-uracil

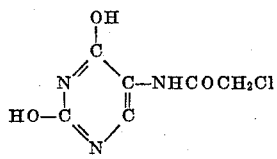

5 gm. of 5-aminouracil were mixed with 20 gm. of chloroacetic acid. The mixture was heated in a closed vessel at 100° C. with partial evacuation of the vessel at 10 minute intervals. The melt was cooled and extracted exhaustively with ether. The crude 5-(chloroacetamino)-uracil was recrystallized from about 800 ml. hot water. The yield of purified material was 6 gm. equivalent to 75% of the theoretical.

EXAMPLE 2

5-(alpha-chloropropionylamino)-uracil

One gm. of 5-aminouracil was refluxed for thirty minutes with 5 gm. of alpha-chloropropionic acid. The product was extracted with ether, 150 ml. of 0.1 m. acetate buffer, pH 5.0 and 300 ml. water successively. The solid was recrystallized from ethanol giving 0.78 gm. (40%) of the pure compound melting at 305° C. with decomposition.

EXAMPLE 3

5-(dichloroacetylamino)-uracil

Two gm. of aminouracil was heated 30 minutes on the boiling water bath with 7.5 gm. dichloroacetic acid under slight vacuum. After extraction with ether and 0.5 N acetic acid the residue was recrystallized from hot water.

EXAMPLE 4

5-(fluoroacetylamino)-uracil was made by heating together 1 gm. of 5-aminouracil and 3 gm. of fluoroacetic acid on the boiling water bath.

EXAMPLE 5

5-(alpha-chlorobutyrylamino)-uracil and 5-(alpha-bromopropionylamino)-uracil were prepared by a method similar to that of Example 4.

EXAMPLE 6

5-(dibromoacetylamino)-uracil was made by heating 1 gm. of 2-ethylmercapto-4-hydroxy-5-aminouracil with 5 gm. of dibromoacetic acid at 120° C. for 45 minutes. During the heating ethylmercaptan was evolved. The compound was purified by extraction with ether and recrystallization from water.

We claim:

1. A 5-acylamino uracil of the formula

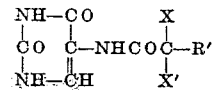

where X is a halogen selected from the group consisting of fluorine, chlorine and bromine, X' is selected from the group consisting of X and hydrogen and R' is a radical selected from the group consisting of hydrogen and the alkyl radicals containing from 1 to 4 carbon atoms.

2. 5-(chloroacetylamino)-uracil.
3. 5-(alpha-chloropropionylamino)-uracil.
4. 5-(dichloroacetylamino)-uracil.

GEORGE H. HITCHINGS.
RANDALL L. THOMPSON.

REFERENCES CITED

The following references are of record in the file of this patent:

FOREIGN PATENTS

| Number | Country | Date |
|---|---|---|
| 206,454 | Germany | Feb. 23, 1908 |
| 285,286 | Germany | Apr. 25, 1914 |

OTHER REFERENCES

Chem. Abstracts; vol. 27; 24275.